(No Model.)  4 Sheets—Sheet 1.
W. D. GRAY.
MIDDLINGS PURIFIER.
No. 502,187.  Patented July 25, 1893.
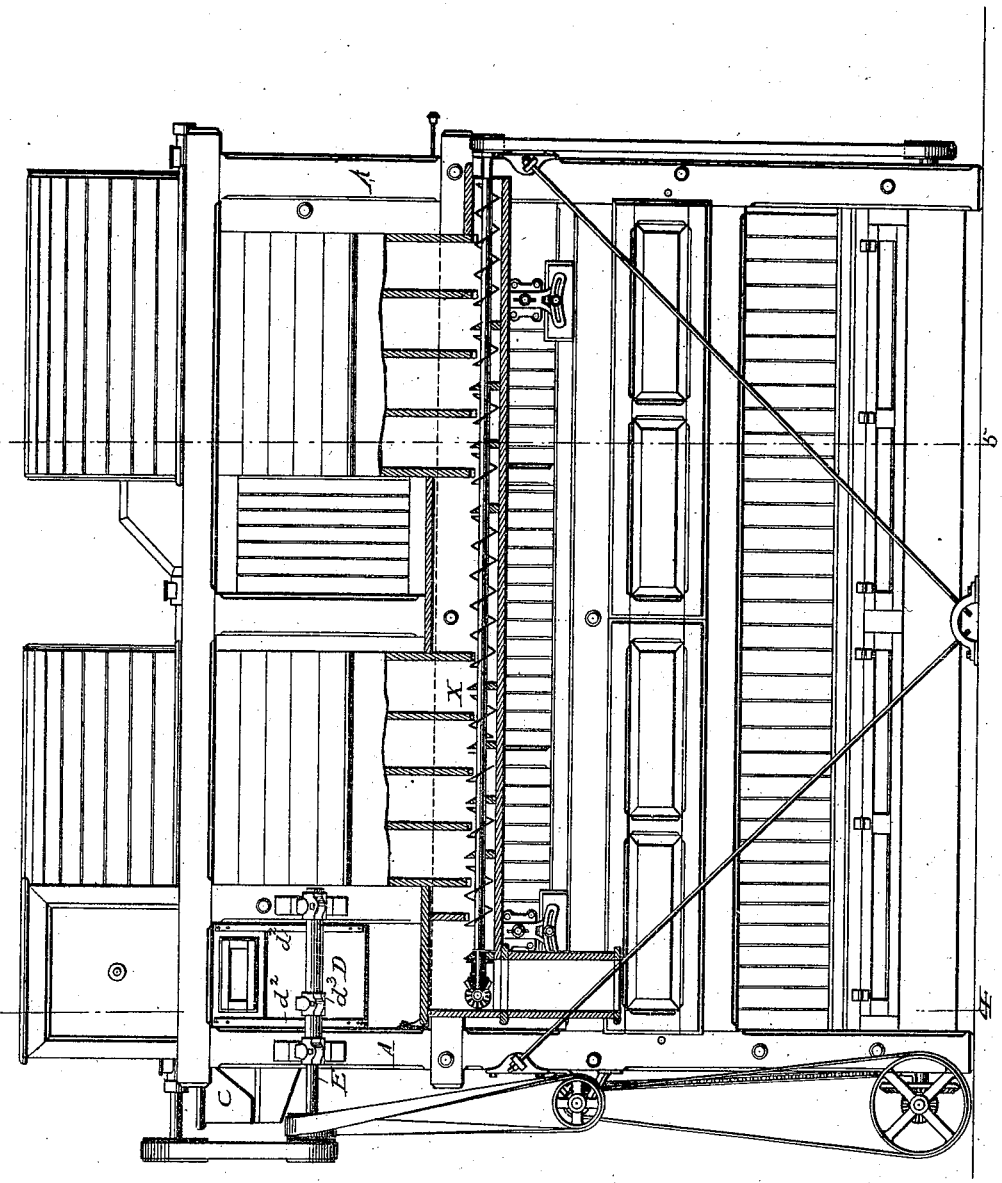
Witnesses
Raymond F. Barnes.
F. S. Elmore
Inventor
W. D. Gray
By P. T. Dodge
Attorney

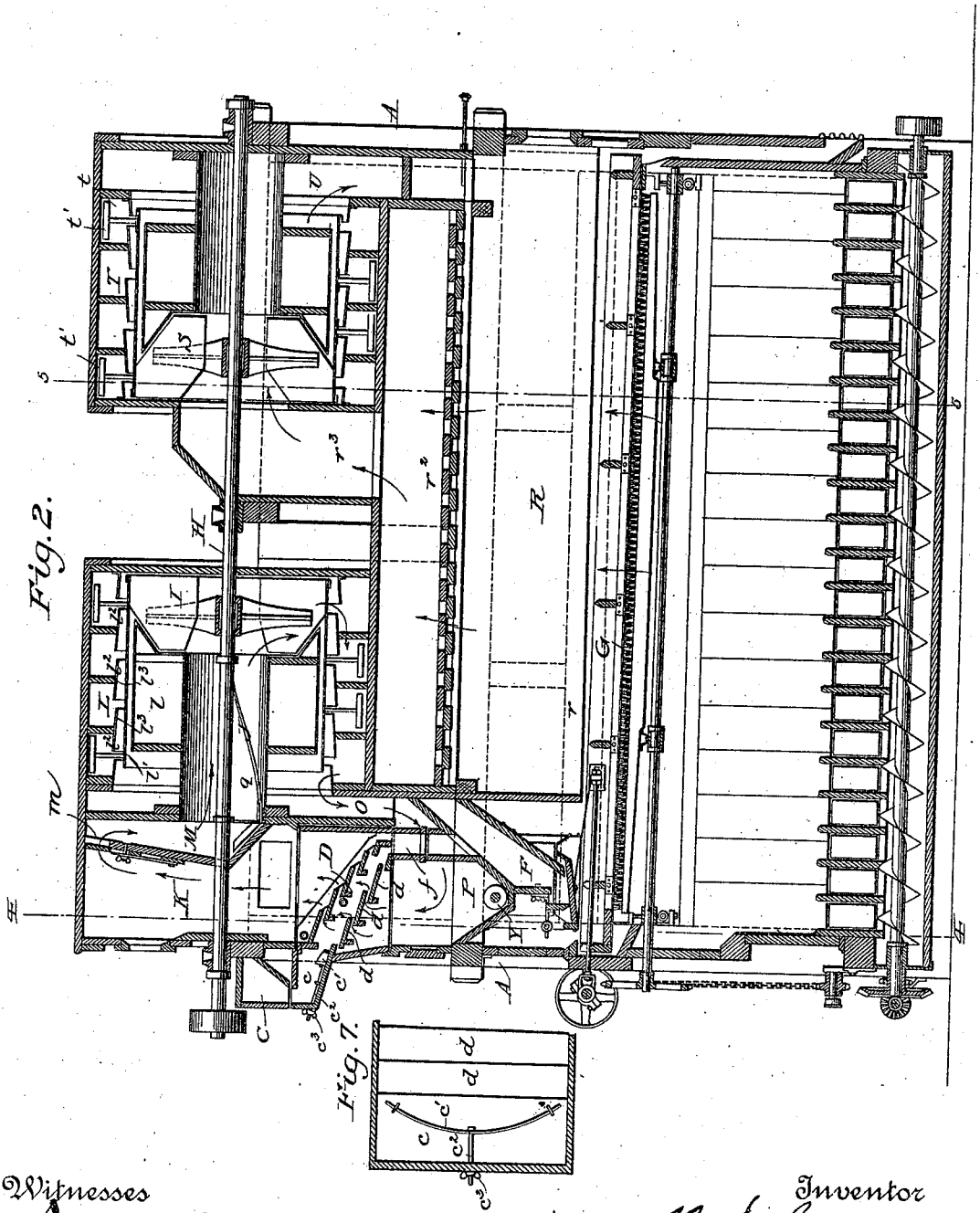

(No Model.) 4 Sheets—Sheet 3.
W. D. GRAY.
MIDDLINGS PURIFIER.
No. 502,187. Patented July 25, 1893.
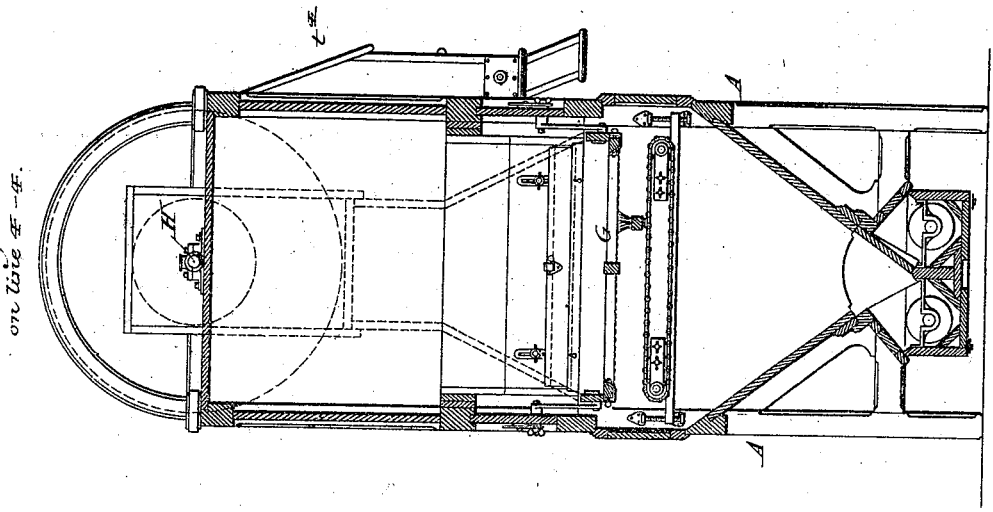
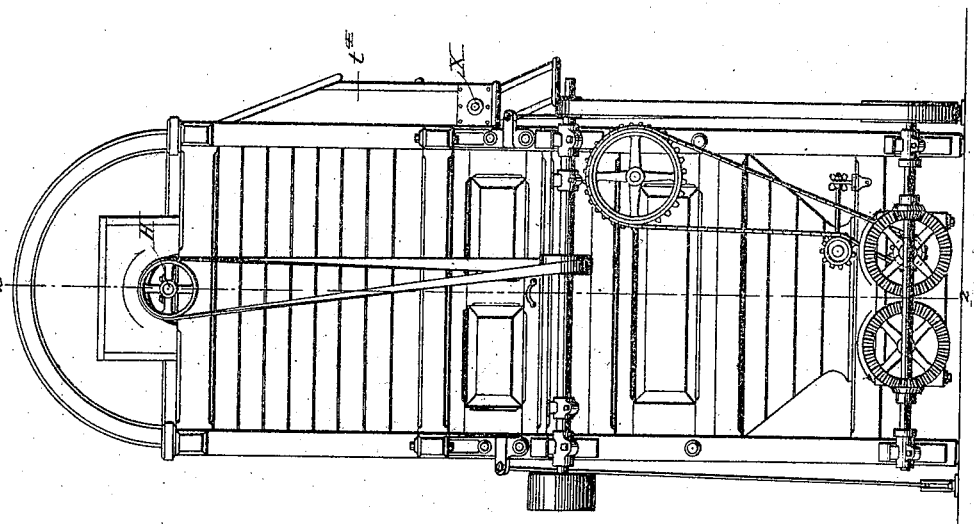
Witnesses
Raymond H. Barnes.
F. S. Elmore.
Inventor
W. D. Gray
By P. T. Dodge
Attorney (No Model.)    W. D. GRAY.    4 Sheets—Sheet 4.
MIDDLINGS PURIFIER.
No. 502,187.    Patented July 25, 1893.
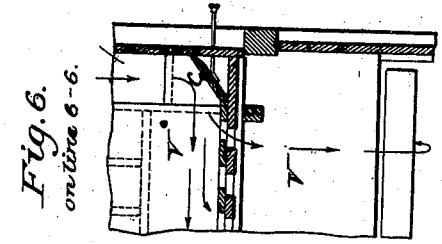
Fig. 6. on line 6-6.
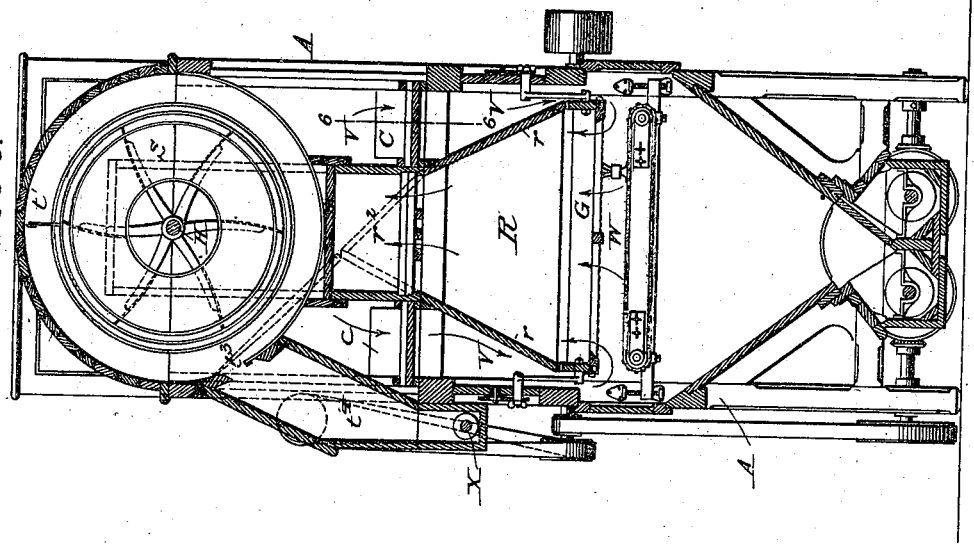
Fig. 5. on line 5-5.
Witnesses
Raymond F. Barnes.
F. S. Elmore.
Inventor
W. D. Gray
By P. F. Dodge
Attorney

UNITED STATES PATENT OFFICE.

WILLIAM D. GRAY, OF MILWAUKEE, WISCONSIN, ASSIGNOR TO THE EDWARD P. ALLIS COMPANY, OF SAME PLACE.

MIDDLINGS-PURIFIER.

SPECIFICATION forming part of Letters Patent No. 502,187, dated July 25, 1893.

Application filed October 8, 1892. Serial No. 448,219. (No model.)

*To all whom it may concern:*

Be it known that I, WILLIAM D. GRAY, of Milwaukee, county of Milwaukee, and State of Wisconsin, have invented a new and useful Improvement in Middlings-Purifiers, of which the following is a specification.

The object of this invention is to provide a machine in which the mechanism for subjecting middlings or other grain products to an air purifying or aspirating process is combined with the shaking sieve for further purifying the material, and with dust collecting mechanisms, the machine as a whole being so organized as to possess great capacity in a comparatively small space, and so as to cause a continuous circulation of the air through the purifiers and dust-catchers, thereby utilizing the same body of air continuously and effectually preventing the escape of dust from the machine. To this end I combine in one machine an aspirating mechanism of any approved form, such for instance as a series of inclined shelves over which the material is flowed, subject to the action of ascending air currents, and in connection with this aspirator, I employ a dust-catcher of any suitable form, by which the dust laden air, rising from the aspirator, is deprived of its dust and returned again through the aspirator. I also employ below the aspirator or in any other suitable position to receive the partly purified material therefrom, a flat shaking screen to further purify the material, and in connection with this screen I employ a dust-catcher and fan, to cause a continuous current of air up through the screen, thence through the dust-catcher, and again downward and upward through the screen in a continuous course.

I have represented in the accompanying drawings those details and peculiar arrangements of parts which I find best adapted for general use; but it will be understood by the skillful mechanic after a consideration of this specification, that the details may be modified both as to form and arrangement without departing from the scope of my invention.

Referring to the accompanying drawings, Figure 1 is a side elevation of my dustless combined purifier, a portion of one side being broken away in order to expose internal parts to view. Fig. 2 is a longitudinal vertical section through the center of the machine on the line 2—2, Fig. 3. Fig. 3 is an end elevation of the head of the machine. Fig. 4 is a vertical cross section through the head of the machine on the line 4—4 of Figs. 1 and 2. Fig. 5 is a similar section through the tail end of the machine on the line 5—5, Figs. 1 and 2. Fig. 6 is a vertical cross section on the line 6—6 of Fig. 5, and showing the deflectors against which the air impinges in its descent toward the screen. Fig. 7 is a horizontal section showing in plan view the spreader-board and means for spreading and distributing the material passing down over the same.

A represents a rigid frame work which may be of any suitable form adapted to sustain the various operative parts hereinafter described. It is tightly inclosed so as to form a trunk, chamber or casing, within which the contained air is continuously circulated as hereinafter explained, it being a special object of my construction to prevent the ingress or egress of the air therefrom. At the head end of this casing is a closed feed hopper C, into which the material to be treated is spouted in the first instance, and from which it flows downward over an inclined spreader board $c$ into the aspirator D, consisting of a series of inclined overlapping shelves or boards $d$, with air spaces between them, the shelves being mounted at their ends in a box like frame, which is suspended by outside hangers $d^2$ and reciprocated by connections from eccentrics $d^3$ on the horizontal shaft E, in the manner in which hoppers and sieves are ordinarily shaken. The purified material continuing downward over the lowermost shelf of the series, flows through a vertical passage $f$, into a hopper F, overlying the head end of the flat, slightly inclined screen or sieve G, constructed after the manner of the screens ordinarily used in middlings purifiers and extending throughout the length and width of the casing so as to divide the same into upper and lower chambers.

In the upper part of the machine I mount a horizontal shaft, H, extending from one end of the frame to the other and carrying near its middle an exhaust fan, I, which communicates through a horizontal tube J with a chamber K, above the aspirator shelves. This fan, kept constantly in motion, serves to produce a constant current of air upward and through the aspirator, the chamber K, and tube J through the fan, whence it is delivered into an annular encircling dust catcher L, hereinafter explained in detail. A chamber M communicating with the receiving end of the tube J is separated from the chamber K by the partition rising nearly to the top of the machine with an air opening $m$ thereover. The chamber K is of greater sectional area than the spaces between the aspirator shelves, and therefore the ascending volume of air is expanded and reduced in speed to correspond, the effect being to redeposit the heavier matters held in suspension, while the dust, fluff and lighter impurities are carried over the opening $m$ into the chamber M and thence through the fan to the dust catcher.

The dust catcher, which is similar to that described in my application for Letters Patent of the United States, filed on the 25th day of January, 1892, Serial No. 419,207, and which is not separately claimed herein, is constructed as follows: A circular closed drum or chamber $l$, encircling the suction tube J, is in turn encircled by a cylindrical revolving screen $l'$, fixed to the periphery of and revolving with the fan. This screen is encircled by a series of parallel, annular chambers or channels $l^2$, open on their inner sides next to the screen. Annular conical rings or flanges $l^3$ are extended around the inner walls of the channels $l^2$ with spaces between their edges but these flanges may be omitted. This series of chambers and the delivery end of the screen communicate through a descending passage O with a transverse hopper P at the head of the machine, and intended to receive such dust and fine impurities as are carried through the dust catcher with the air. The dust laden air, passing through the fan is driven outward through the annular spaces between the drum $l$ and the surrounding screen and escapes through the screen, carrying with it the dust that passes into the annular chambers $l^2$ in succession, with an eddying or reacting movement. The result is that the dust is largely deposited in these channels, while the air returning through the annular spaces and through one chamber after another, descends finally into the chamber P and thence upward again through the aspirator, to repeat the course above described.

In order to prevent the accumulation of dust within the tube J, a spiral blade or scraper $q$ is connected by arms to the fan shaft, in order to sweep around the interior of the tube J and force the solid matters toward the fan.

In order to secure a uniform distribution of the material flowing to the aspirating shelves, I mount transversely, near the lower edge of the spreader board $c$, a flexible bar $c'$ higher at the middle than at the ends, in staples or similar supports, which will admit of its being bent. A rod $c^2$ is attached to the middle of this bar, extended to the outside of the machine and provided on its outer end with a thumb-nut $c^3$, by turning which the bar may be bent so that it will have a tendency to throw or distribute the material sidewise from the center as it flows thereover. This will insure a uniform distribution of the material throughout the width of the aspirator.

Attention is now directed to the shaking sieve and its adjuncts. The sieve will be constructed and mounted in any ordinary manner and driven by eccentrics or any other customary appliance adapted to give it a longitudinal, lateral or circulatory movement. Above this screen, throughout its length, I construct a vacuum or suction chamber R, having inwardly sloping walls $r$, the lower edges of which terminate directly over the edges of the screen, with which they form a close connection through the intervention of wool or other soft material. The upper and narrow side of this chamber communicates through a grated valve $r^2$ and an upright passage $r^3$ with a second suction fan S, mounted on the shaft H before mentioned. The fan delivers through a surrounding dust catcher T, similar to that before described, into a passage U, extending downward and communicating in its turn with two chambers V lying outside of the walls of the vacuum chamber, and between said walls and the outer casing of the machine. These chambers V extend the entire length of the machine and communicate through the narrow openings along the sides of the screen with the chamber W thereunder. The action of the fan causes the air to ascend continuously through the screen or sieve G, agitating and purifying the material thereon and carrying the light matters upward through the fan into the dust-catcher, by which they are received and retained while the purified air continues its course downward through the passage U and thence forward through the passages V, which effect its uniform distribution, and finally downward past the sides of the screen into the chamber W. Flowing inward from opposite sides of this chamber it ascends uniformly through all parts of the machine. The dust which lodges in the annular chambers $t$ of the dust-catcher, is discharged in the same manner as in the first catcher, by means of blades $t'$ attached to and revolving with the cylindrical screen and serving to sweep the accumulated matters upward from the bottom of the chambers and outward through an elevated side opening $t^3$ into a closed receiving chamber or pocket $t^4$, containing a longitudinal conveyer screw X which also receives the dust in like manner from the first catcher delivering it all as shown in Fig. 1, through a spout at the head of the machine. A transverse conveyer Y, located in the head end of the machine is geared with the conveyer X, above described, and the screws of the two conveyers run in such direction that both deliver to the same outlet.

The machine is provided at the bottom with the usual gathering boards, conveyers and dividers.

In order to distribute the descending air throughout the length of the machine, that there may be a substantially uniform current through the screen at all points, I mount at the tail end, in the path of the descending air, deflector boards C, having upturned or inclined ends as shown.

It will be observed that in the foregoing machine the material is subjected to two successive and independent purifications, and that each purifying apparatus is provided with its own fan and circulating system, and that although the dust-laden air is continuously and rapidly purified, there is no possibility of the blowing of dust from the machine into the surrounding atmosphere. It will also be observed that the various separating and purifying mechanisms are all combined in one machine, which, although of far greater capacity, occupies but little more space than the ordinary sieve purifier.

Having thus described my invention, what I claim is—

1. The combination and arrangement in a middlings purifier of an aspirator a dust catcher, and fan arranged to circulate the air through the aspirator and dust catcher, a sieve arranged to receive partially purified material from the aspirator; a second dust catcher communicating with the sieve, and a fan arranged to circulate air through the sieve and said second dust catcher, substantially as shown and described.

2. In a middlings purifier the combination and arrangement of two purifying mechanisms, one arranged to deliver to the other, each purifying mechanism including a dust-catcher and a circulating fan, substantially as shown and described.

3. In a middlings purifier the combination of an external casing, a feed mechanism, a series of aspirating shelves to which the said mechanism delivers the material to be purified; a shaking screen to which the material is delivered from the aspirator; a dust catcher communicating with chambers above and below the aspirating shelves; a fan to circulate the air in an upward direction between the shelves and thence through the dust catcher and the space beneath the shelves; a suction chamber overlying the screen; side chambers opening above the sides of the screen and a chamber thereunder; a dust catcher communicating with the suction chamber, and a fan arranged to induce a continuous circulation of air upward through the screen and the suction chamber, to the dust catcher and thence in a downward direction past the sides of the screen, that it may re-ascend therethrough.

4. In a middlings purifier the aspirator and the sieve to which it delivers, in combination with the suction chamber and side chambers overlying the screen; the two dust catchers communicating respectively with the aspirator and the screen, and a shaft provided with two fans for maintaining currents of air through the respective dust catchers and their connections.

5. In a middlings purifier in combination with the aspirator shelves, the underlying chamber, the overlying chamber, the annular dust catcher communicating at the top with the last named chamber and fan, and a passage extending thence to a chamber beneath the aspirator.

6. In combination with a dust catcher comprising a horizontal cylindrical screen, a series of annular chambers or pockets and a fan turning on a horizontal axis, said catcher communicating through a top opening with the upper part of the aspirator chamber and through a lower passage with the base of the aspirator chamber.

7. In combination with the aspirator, the dust catcher, consisting of the cylindrical screen, the annular chambers and the fan, a passage leading from the top of the aspirator chamber downward, to the center of the dust catcher; a central tube in the latter, and rotary blades to prevent the lodgment of material in said tube.

8. In a middlings purifier the combination of the shaking sieve, the overlying suction chamber, the side chambers opening downward past the sides of the sieve, the horizontal shaft carrying a fan and a cylindrical screen, the annular dust receiving pockets or chambers encircling the screen; a passage leading from the suction chamber to the fan and a passage leading from the fan and dust catcher to the side chamber above the sieve.

9. In combination with the sieve, the overlying suction chamber and side chambers; the horizontal dust catcher communicating with the suction chamber, the chamber leading from the dust catcher to the side chambers, and a deflector arranged in the path of the down going air to distribute the same lengthwise of the side chambers.

10. In combination with the aspirator, the screen and the two dust catchers communicating with the aspirator and screen respectively, the dust receiving chamber of the aspirator, its delivery conveyer and the side conveyer delivering the dust from the two dust catchers.

In testimony whereof I hereunto set my hand, this 23d day of March, 1892, in the presence of two attesting witnesses.

WILLIAM D. GRAY.

Witnesses:
RICHARD HOPPIN,
WILLIAM BANNEN.